United States Patent
Takahashi et al.

Patent Number: 5,988,363
Date of Patent: Nov. 23, 1999

[54] SUPPORT RAIL FOR A TABLE TOP CHAIN

[75] Inventors: Toshio Takahashi; Katsutoshi Shibayama; Masaaki Ikeda, all of Osaka-fu, Japan

[73] Assignee: Tsubakimoto Chain Co., Osaka, Japan

[21] Appl. No.: 08/865,763

[22] Filed: May 30, 1997

[30] Foreign Application Priority Data

May 31, 1996 [JP] Japan ..................................... 8-138563

[51] Int. Cl.⁶ .................................................. B65G 15/62
[52] U.S. Cl. .......................................... 198/841; 198/837
[58] Field of Search ..................... 198/837, 841

[56] References Cited

U.S. PATENT DOCUMENTS

| | | | |
|---|---|---|---|
| 2,866,538 | 12/1958 | Goldberg | 198/841 |
| 3,711,090 | 1/1973 | Fiedler | 198/841 X |
| 4,611,710 | 9/1986 | Mitsufuji | 198/803.01 |
| 4,724,953 | 2/1988 | Winchester | 198/841 X |
| 4,944,384 | 7/1990 | Herron | 198/841 X |
| 4,989,723 | 2/1991 | Bode et al. | 198/635 |
| 5,040,549 | 8/1991 | Ray | 198/841 X |
| 5,277,246 | 1/1994 | Monch | 198/841 X |
| 5,601,180 | 2/1997 | Steeber et al. | 198/841 X |

FOREIGN PATENT DOCUMENTS

| | | |
|---|---|---|
| 43 13 143 | 10/1994 | Germany . |
| 2 176 454 | 12/1986 | United Kingdom . |

*Primary Examiner*—James R. Bidwell
*Attorney, Agent, or Firm*—Armstrong, Westerman, Hattori, McLeland and Naughton

[57] ABSTRACT

A support rail for a table top chain abraded powder or similar substances which intervene between top plates and support rails of a table top chain. A support rail is secured to a conveyor frame by means of threaded screws so as to support both sides at the lower surface of a top plate of a table top chain. The support rail has a plurality of circular concave recesses formed on the sliding surface relative to the top plate in a zigzag pattern for trapping obstacles such as abraded powder, liquid or lubricant on the sliding surface. The concave recess does not penetrate through the surface to the rear face, but serves to accumulate the abraded powder or similar therein.

6 Claims, 3 Drawing Sheets

SUPPORT RAIL FOR A TABLE TOP CHAIN

TECHNICAL FIELD OF THE INVENTION

The present invention concerns a support rail for trapping obstacles such as abraded powder, liquid or lubricant which intervenes between a support rail of a table top chain and a top plate of the table top chain on a sliding surface during running of the table top chain.

BACKGROUND OF THE INVENTION

The table top chain is used for carrying and transporting articles on a top plate. In the table top chain, rails for supporting the chain are disposed along the reciprocation track of the chain, and the rails are secured to a conveyor frame, for example, by means of small machine screws.

However, during the running of the table top chain, abraded powder is formed on the sliding surface between the support rail and the top plate. Particularly, in a table top chain used without lubrication, since the support rail and the top plate are often made of a resin, an abraded powder is formed most markedly at the initial stage of the operation.

In conventional support rails, since the upper surface is flat, there is no substantial room for allowing the abraded powder to escape. The abraded powder is discharged, for example, laterally from the sliding surface and accumulates on the support rails to markedly degrade the outer looks of the conveyor. Also, abraded powder is deposited onto articles, causing a problem in view of quality, in a case where the table top chain is used for the transportation of foodstuffs or chemicals.

Further, when the table top chain is used in a wet situation, liquids intervening on the sliding surface make the support rail and the top plate be in close contact with each other. This increases the resistance to running to necessitate a large power for traction of the table top chain.

Further, if the support rail and the top plate are made of metal, lubrication for the sliding surface is necessary. However, if a lubricant is supplied in a somewhat excessive amount with a view of preventing lubricant from exhaustion, the lubricant leaks out of the sliding surface to cause problems, like that in the abraded powder, of degrading the outer looks and deposition of the lubricant to articles.

SUMMARY OF THE INVENTION

In view of the above, the foregoing problems are solved by providing a sliding surface of a top plate of a support rail which is laid along a track of a table top chain, in accordance with the present invention, and by forming obstacle-trapping concave recesses for trapping abraded powder, liquid or lubricant.

During the running of the table top chain, abraded powder or similar intervenes on the sliding surface between the support rail and the top plate. The obstacles are drawn by the top plate and then, trapped in the concave recesses.

If the trapped obstacles are abraded powder or liquid, they are removed successively upon stopping of the operation of the table top chain, thereby making it possible to keep the table top chain clean. Further, if the trapped obstacles are lubricant, the lubricant can intervene in an appropriate amount on the sliding surface by continuation and interruption of supply to keep the table top chain clean.

It is sometimes desirable to completely eliminate obstacles such as abraded powder of liquid from the sliding surface. In such a case, it is preferred that the concave recesses of the rail be in communication with an obstacle discharging gutter. The abraded powder or similar trapped by the concave recesses is not accumulated on the sliding surface, but always discharged to the obstacle discharging gutter.

In this case, it is further preferred that the concave recesses formed in the sliding surface of the support rail be in communication only with an airtight obstacle discharging gutter, and the pressure in the obstacle discharging gutter be reduced, thereby removing the abraded powder or similar compulsorily from the sliding surface.

DETAILED DESCRIPTION OF THE INVENTION

Figure 1:
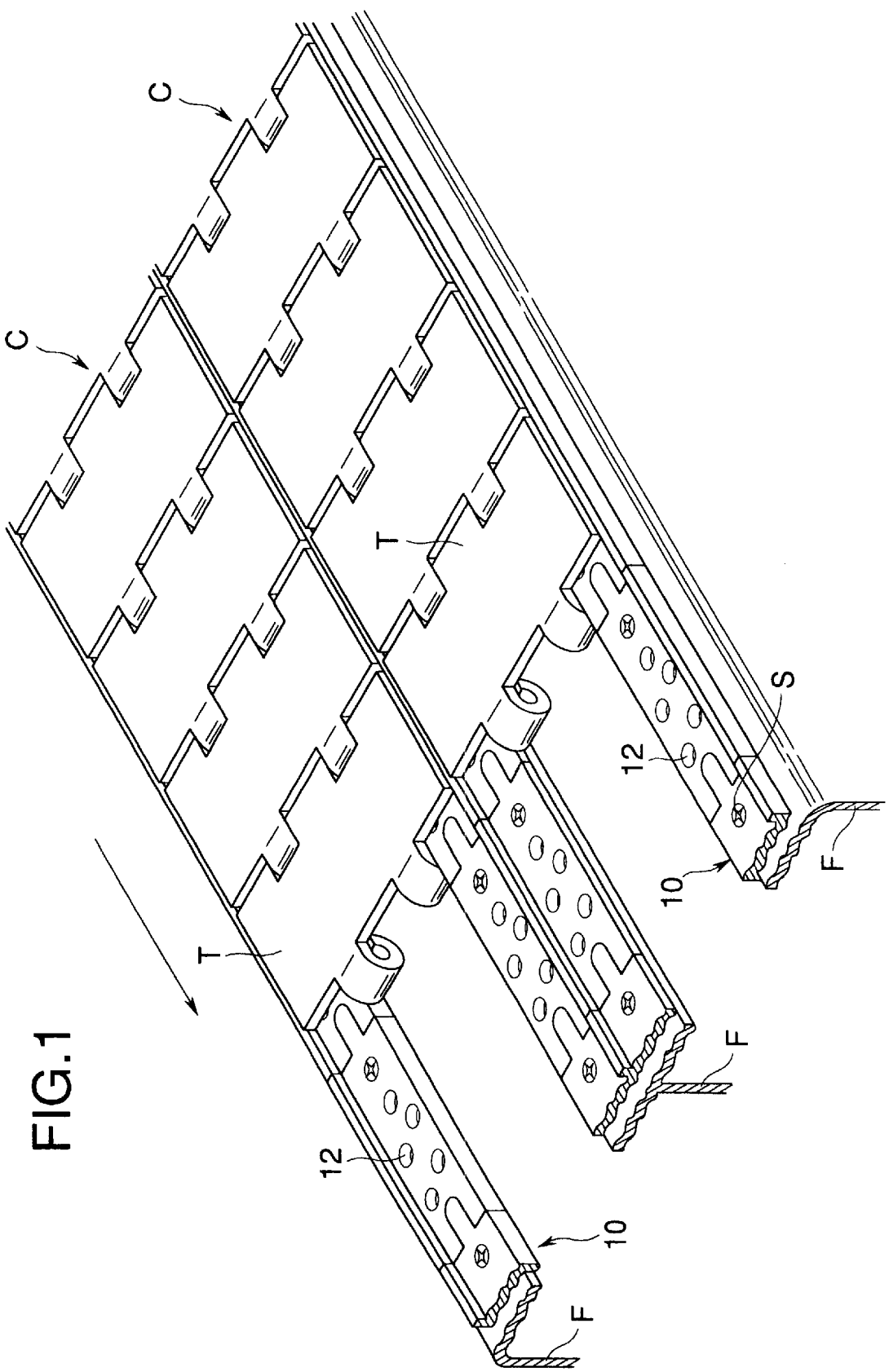
FIG. 1 is a perspective view illustrating a first embodiment of support rails according to the present invention.
Figure 2:
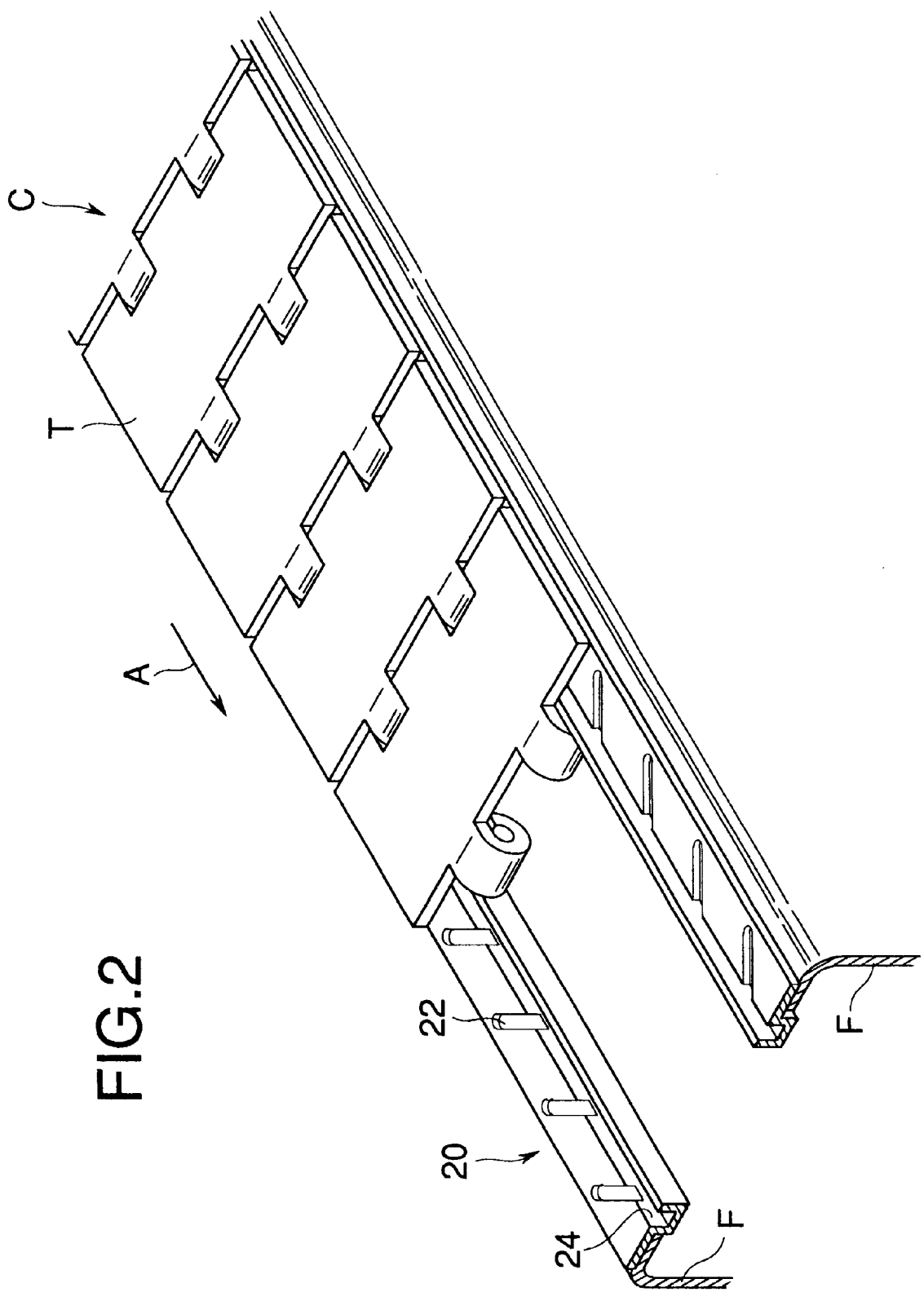
FIG. 2 is a perspective view illustrating a second embodiment of support rails according to the present invention.
Figure 3:
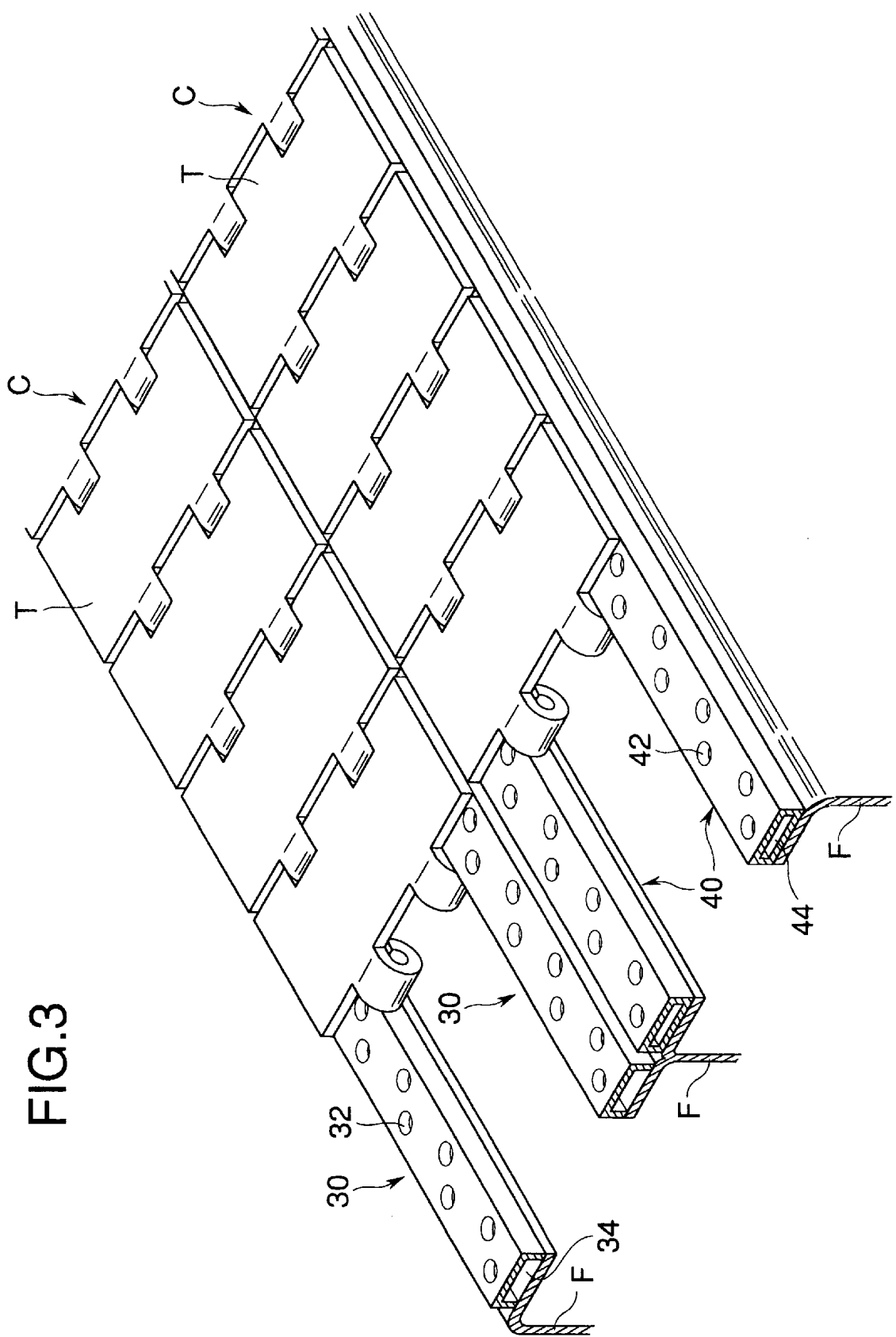
FIG. 3 is a perspective view illustrating a third embodiment of support rails according to the present invention.

A preferred embodiment of a rail according to the present invention will be explained with reference to the drawing figures. FIG. 1 shows a first embodiment of a support rail according to the present invention. FIG. 2 shows a second embodiment of a support rail according to the present invention. FIG. 3 shows a third embodiment of a support rail according to the present invention. Each of the table top chains C comprise a top plate T. Each top plate T has an identical shape and each top plate T is connected to an adjacent top plate T by way of pins. The table top chain C may also include those types having a top plate T attached to each of links which are connected with each other.

As shown in FIG. 1, a support rail 10 is secured to a conveyor frame F by means of a threaded screw S so as to support both sides at the lower surface of the top plate T of the table top chain C. The figure shows a forwarding path in which the top plate P carries articles, but the support rail 10 supports the load carrying surface of the top plate T in the returning path of the table top chain C.

In the support rail 10, a plurality of circular concave recesses 12 are formed for trapping obstacles such as abraded powder, liquid and lubricant in addition to through-holes for the screws S on the sliding surface of the top plate T. The concave recess 12 does not penetrate through the rear face of the surface, but is used for accumulating the abraded powder or similar therein. Obstacle accumulated in the concave recesses 12 are removed for periodical cleaning.

The concave recesses 12 are formed in a zigzag pattern on the sliding surface and trap the obstacle on the sliding surface over the entire area thereof. The concave recesses 12 may be formed as a long groove extending in the lateral direction of the support rail 10 to trap obstacle over the entire sliding surface. The support rail 10 has a segment shape molded from a resin such as polyacetal or ultra high molecular weight polyethylene. The concave recesses 12 are formed integrally upon molding the support rail 10. The concave recesses 12 may also be formed by machining, after molding the support rail.

The support rail, shown in FIG. 1, is suitable for trapping of the abraded powder, liquid or lubricant. If the obstacle is an abraded powder, the abraded powder is accumulated in the concave recesses 12 to keep the sliding surface clean. If the obstacle is water or other similar liquid, the liquid is accumulated in the concave recesses 12 to prevent close contact between the top plate T and the support rail 10 at the sliding surface, thereby allowing the table top chain C to move. If the obstacle is a lubricant, the lubricant can be accumulated in the concave recesses 12 to facilitate the control for the amount of the lubricant to be supplied.

A support rail 20, shown in FIG. 2, has obstacle discharging gutters 24 at opposing inner edges extending in the conveying direction A of the table top chain C. The concave recesses 22 formed in the sliding surface are concave grooves which are inclined so as to converge in the conveying direction A of the table top chain C and are in communication at the inner edge of the support rail 20 with the obstacle discharging gutters 24. With such a configuration, the abraded powder or liquid intervening on the sliding surface is trapped in the concave recesses 22 and then, guided into the obstacle discharging gutters 24 by the top plate T, without stagnating on the sliding surface.

The support rail 20, according to the present invention, is particularly useful in the case of using a table top chain C in a wet atmosphere. The concave recesses 22 make water intervening on to the sliding surface not continuous so as to prevent close contact between the top plate T and the support rail 10, thereby enabling smooth operating of the table top chain C.

FIG. 3 shows support rails 30, 40, not for accumulating obstacles on the sliding surface into the concave recesses 32, 42, but for allowing the obstacles to fall through the concave recesses 32, 42. The support rails 30, 40 in this embodiment each have a U-shaped cross-sectional shape or hollow rectangular cross-sectional shape. The support rail 30 of the U-shaped cross-sectional shape, has penetrating concave recesses 32 in communication with an obstacle discharging gutter 34 formed between the rail and a conveyor frame F. The hollow support rail 40, being of a rectangular cross-sectional shape, has penetrating concave recesses 42 in communication with an obstacle discharging gutter 44 formed at the inside.

Obstacles on the sliding surface are caused to fall through the penetrating concave recesses 32 and 42 to the obstacle discharging gutters 34 and 44 respectively. With such a configuration, it is possible to increase the amount of obstacles trapped in the obstacle discharging gutter 34, 44.

Further, by reducing the pressure at the inside of the obstacle discharging gutters 34 and 44, the obstacles on the sliding surface are compulsorily sucked and removed by way of the penetrating concave recesses 32 and 42 to the obstacle discharge gutters 34 and 44. The support rails 30 and 40 in this embodiment are useful as the support rails for the table top chain C in an apparatus for manufacturing foodstuffs or chemicals for which high quality is demanded.

As has been described specifically above according to the present invention, since the concave recesses are formed in the sliding surface of the support rails, obstacles not preferred to be on the sliding surface can be trapped into the concave recesses, to thereby prevent leakage of the abraded powder or similar to the periphery of the support rails. Accordingly, by using the support rails according to the present invention, the outer looks around the conveyor can be well-kept, and deposition of the abraded powder or similar to the articles carried on the top plate can be prevented. Thus, foodstuffs and chemicals undergoing strict regulation in view of the quality can be conveyed cleanly. Further, by removing the abraded powder or similar from the sliding surface, power loss can be minimized and the cycle for maintenance and inspection can be extended, to operate the table top chain at a reduced running cost.

In the second embodiment of the invention, since the obstacles can be discharged completely from the sliding surface to the obstacle discharging gutters in communication with the concave recesses, the amount of obstacles contained can be increased markedly, and the table top chain can be operated with no maintenance for a long period of time.

We claim:

1. A support rail for a table top chain including a conveyor frame extending along a track of the table top chain, and a top plate movable in a direction along the track of the table top chain, said support rail being secured to the conveyor frame, comprising:

a sliding surface laid along the track of the table top chain and slidably supporting thereon the top plate; and a plurality of concave recesses formed in a zigzag pattern in said sliding surface for removing obstacles which intervene between said sliding surface and the top plate.

2. A support rail according to claim 1, wherein each of said concave recesses is a blind concave recess extending from said sliding surface and terminating short of a surface of said support rail on the opposite side of said sliding surface.

3. A support rail according to claim 1, wherein said support rail has an inverted U-shaped cross-sectional shape and defines together with the conveyor frame an obstacle discharging gutter, and wherein each of said concave recesses is a penetrating concave recess communicating with said obstacle discharging gutter.

4. A support rail according to claim 1, wherein said support rail has a hollow rectangular cross-sectional shape and defines therein frame an obstacle discharging gutter, and wherein each of said concave recesses is a penetrating concave recess communicating with said obstacle discharging gutter.

5. A support rail according to 1, 2, 3 or 4, wherein said concave recesses have a circular shape.

6. A support rail according to claim 1, wherein said support rail has an obstacle discharging gutter formed integrally with and extending along one longitudinal edge thereof, and said concave recesses are concave grooves inclined so as to converge in the direction of movement of the top plate and communicating at one end with said obstacle discharging gutter.

* * * * *